United States Patent [19]
Swift

[11] Patent Number: 4,741,942
[45] Date of Patent: May 3, 1988

[54] ELECTROSTATIC CHARGING AND CLEANING BRUSHES

[75] Inventor: Joseph A. Swift, Ontario, N.Y.

[73] Assignee: Xerox Corporation, Stamford, Conn.

[21] Appl. No.: 938,500

[22] Filed: Dec. 5, 1986

Related U.S. Application Data

[62] Division of Ser. No. 804,563, Dec. 4, 1985, Pat. No. 4,706,320.

[51] Int. Cl.[4] .................. B32B 3/00
[52] U.S. Cl. .................. 428/82; 428/62; 428/88; 15/1.5 R
[58] Field of Search .................. 428/62, 36, 82, 88; 15/1.5

[56] References Cited

U.S. PATENT DOCUMENTS 3,836,421 9/1974 Terry et al. .................. 428/88

Primary Examiner—Marion C. McCamish

[57] ABSTRACT

A cylindrical fiber brush useful in electrostatic charging and cleaning in an electrostatographic imaging process comprises an elongated cylindrical core having bound thereto a spirally wound conductive pile fabric strip forming a spiral seam between adjacent windings of the fabric strip, the fiber fill density of said fabric strip at the strip edge being at least double the fiber fill density in the center portion of the fabric strip. The increased fiber fill density at the strip edges provides additional fibers to fill the seams between the adjacent windings and improves the charging and cleaning performance at low rotational speeds.

6 Claims, 6 Drawing Sheets

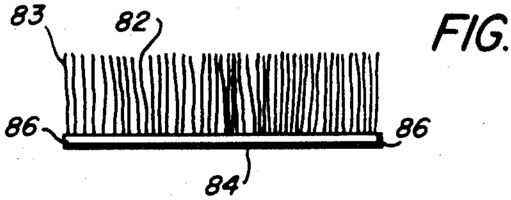
FIG. 5
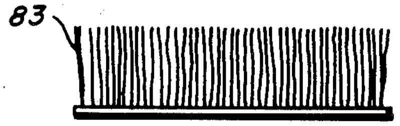
FIG. 6a
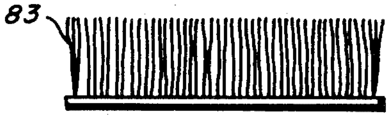
FIG. 6b
FIG. 6c
FIG. 7a
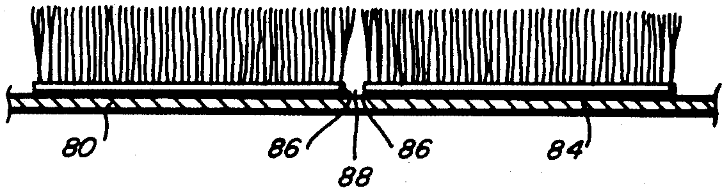
FIG. 7b
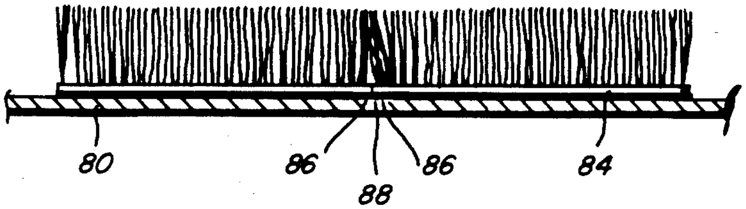

ELECTROSTATIC CHARGING AND CLEANING BRUSHES

This is a division of application Ser. No. 804,563, filed Dec. 4, 1985, now U.S. Pat. No. 4,706,320.

CROSS-REFERENCE TO RELATED APPLICATIONS

Reference is hereby made to U.S. application Ser. No. 413,960, entitled "Fiber Cleaning Brush System", in the name of Donald A. Seanor, filed Sept. 1, 1982 and commonly assigned to the assignee of the present application now abandoned.

BACKGROUND OF THE INVENTION

The present invention relates to brushes and in particular to electrostatic charging and cleaning brushes for use in electrostatographic imaging systems.

In an electrostatographic reproducing apparatus commonly used today, a photoconductive insulating member may be charged to a suitable potential, thereafter exposed to a light image of an original document to be reproduced. The exposure discharges the photoconductive insulating surface in exposed or background areas and creates an electrostatic latent image on the member which corresponds to the image areas contained within the original document. Subsequently, the electrostatic latent image on the photoconductive insulating surface is made visible by developing the image with a developing powder referred to in the art as toner. During development the toner particles are attracted from the carrier particles by the charge pattern of the image areas on the photoconductive insulating area to form a powder image on the photoconductive area. This image may be subsequently transferred to a support surface such as copy paper to which it may be permanently affixed by heating or by the application of pressure. Following transfer of the toner image to the support surface the photoconductive insulating surface may be discharged and cleaned of residual toner to prepare for the next imaging cycle.

Both the step of charging the imaging member and the step of cleaning the imaging member of residual toner following transfer of the image to the copy sheet have been suggested to be accomplished by the use of rotating fiber brushes. For example, Japanese Patent Publication No. 56-139156(A) published Aug. 18, 1983 shows two rotating brushes to uniformly charge a photoreceptor, Japanese Patent Publication No. 57-49965(A), published Mar. 24, 1982 describes a friction charger for a photosensitive medium. Japanese Patent Publication No. 57-49964(A) published Mar. 24, 1982 illustrates brush charging with a conductive liquid to prevent variations in charging. Japanese Patent Publication No. 57-46265(A), published Mar. 16, 1982, describes a carbon containing charging brush. Japanese Patent Publication No. 58-14908(A), published Sept. 5, 1983, illustrates a conductive brush charger and cleaner.

The above referenced Seanor application, together with U.S. Pat. No. 4,494,863 to John R. Laing, issued Jan. 22, 1985, describes electrostatically biased brushes used as cleaners in an electrostatographic reproducing apparatus.

The problem frequently encountered with brushes used in electrostatic charging and cleaning is that their performance latitude can be severely limited by the presence of seam gaps or slight void areas interspacing the spiral wound fabric in the brush. Since it is desirable to use these rotatably mounted charging and cleaning brushes at the lowest possible rotational speeds to reduce toner emissions, to reduce brush and imaging surface wear, and to minimize the energy required to rotate the brushes, frequently non-uniform or streaky charging and cleaning performance is apparent due to seams, or void areas between the spiral windings of the fabric. While it is recognized that charging and cleaning efficiency may be improved by rotating the brushes at an increased speed, thereby masking the presence of seam gaps, the benefits alluded to above are thereby lost In addition this contributes to increased brush speeds, higher emitted noise, more expensive bearings and enhanced structural support for the apparatus.

Seam gaps interspacing the spiral wound fabric occur frequently in traditional brush manufacturing processes wherein the seam interface cannot be precisely nor reliably controlled. Several factors contribute to this shortfall. First, since loss of conductive fibers from these brushes can contaminate sensitive electrical devices within an electrostatographic copier, a narrow flange of backing material must be woven or knitted along each edge of the strips of pile fabric during the fabric manufacturing process. These flanges permit slitting of the fabric by ultrasonics, or hot knife, or other means that melts and seals the lengthwise cut edges of the pile strips without allowing any cutting or severing of conductive pile fibers or regions where conductive pile fibers connect with the backing fabric. Thus, integrity of the conductive fibers themselves and within the backing is preserved. In practice however, the width of the flange itself cannot be precisely controlled. Therefore, in the case where two sections of pile fabric having relatively wide flanges are abutted during spiral winding onto the brush core, pile fiberless areas result in one type of seam gap.

A second type of seam gap is experienced during large scale brush manufacture where a mechanized spiral winding apparatus is used to wind the strip of pile fabric in a spiral configuration onto a cylindrical core. Typically, these machines cannot precisely abut the strips without seams or overlap. In the case where overlap must be avoided, a compromise is thusly made towards somewhat wider seam gaps.

A third type of seam gap can be identified as caused by variations in the width of the fabric strips themselves. Typically, the fabric strips are backcoated with a conductive latex after which heat is applied to assist in drying the latex coating. Some non-uniform shrinkage can occur during this coating and drying process. In the case where two relatively narrow sections of fabric strip are abutted during a constant pitch spiral winding process, a seam gap can result.

PRIOR ART

U.S. Pat. No. 4,005,512 to Kandel, issued Feb. 1, 1977 discloses a cleaning brush for electrostatic apparatus and a method of making same wherein the edges of a spirally wound pile fabric are held together on a core by folding the edges of the fabric during winding. See FIG. 2, column 3, lines 15–26 and column 6, line 1.

SUMMARY OF THE INVENTION

In accordance with the present invention, cylindrical fiber brushes useful in both charging and cleaning applications in electrostatic imaging systems have been provided. These brushes comprise an elongated cylindrical core having bound thereto a spirally wound conductive fabric pile strip forming a spiral seam between adjacent windings of said fabric strip, the fiber fill density of the fabric strip at the strip edges being at least double the fiber fill density in the center portion of the fabric strip.

In a specific aspect of the present invention, the fabric is a cut plush pile woven fabric adhesively bound to the cylindrical core.

In a further aspect of the present invention, the fibers of the fabric are electrically conductive having a resistivity of between $10^{-6}$ and $10^{9}$ ohms-cms.

In a further aspect of the present invention, the pile fiber fill density at the outermost pile ends at the strip edges of the fabric is at least double the pile fiber fill density in the center portion of the fabric strip.

In a further aspect of the present invention, the abutment of the flanges of the spiral strip between adjacent windings forms a space between the adjacent piles at least 1mm in width and wherein the enhances fiber fill density of the fabric strip edge substantially spreads fills this space.

In a further aspect of the present invention, the brush may be used as a cleaning brush having a fiber fill density of 14,000 to 40,000 fibers per square inch of 7 to 25 denier per filament fibers and a pile height from about ¼ inch to 1 inch.

In a further aspect of the present invention, the brush may be used in electrostatic charging brush and has a fiber fill density of about 100,000 to about 250,000 fibers per square inch of 1 to 10 denier per filament fibers and a pile height from about 0.1 to 0.5 inches.

BRIEF DESCRIPTION OF THE DRAWINGS

The above aspects of the present invention will become apparent as the following description proceeds upon reference to the drawings in which:

FIG. 5 is a schematic representation in cross section of fabric according to the prior art prior to spiral winding on a cylindrical core.

FIGS. 6A, 6B, 6C are alternative embodiments schematically representing in cross section a strip of fabric prior to spiral winding on a cylindrical core according to the present invention.

FIGS. 7A and 7B are schematic representations in cross section of abutting fabric strips when wound on a cylindrical core according to the present invention.

DETAILED DESCRIPTION OF THE PREFERRED EMBODIMENT

For a general understanding of the features of the present invention description thereof will be made with reference to the drawings.

Figure 1:
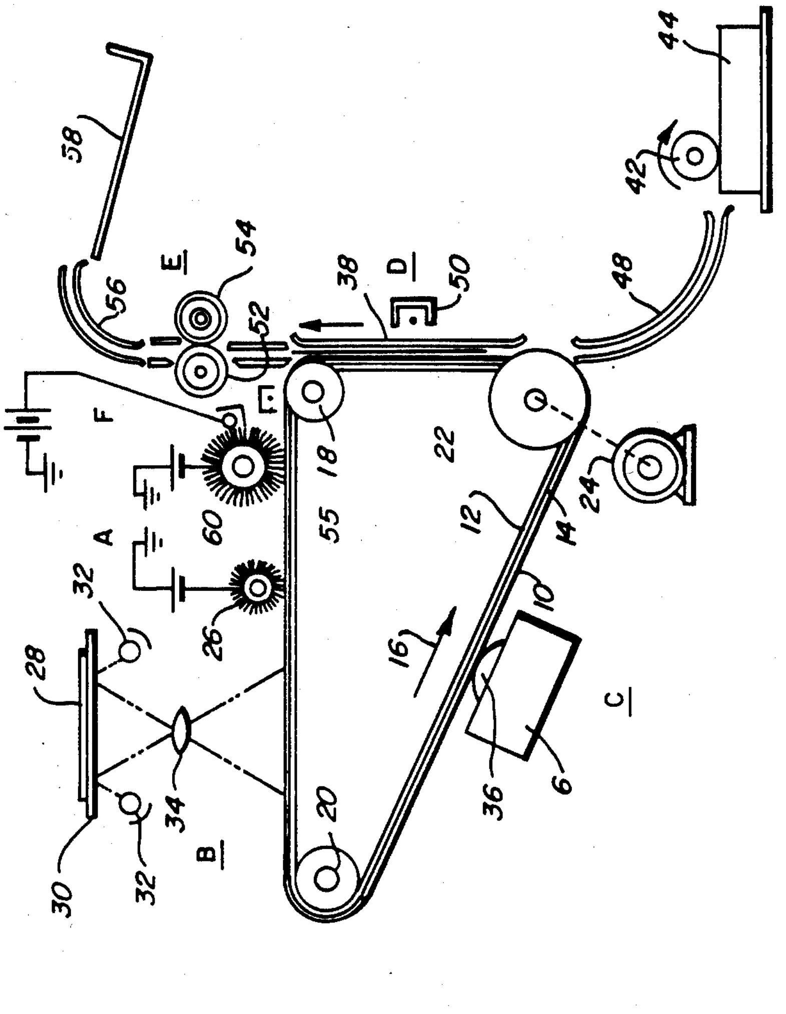
FIG. 1 is a schematic view of electrostatographic reproducing apparatus incorporating the features of the present invention.

FIG. 1 schematicaly depicts the various components of an illustrative electrostatographic printing machine incorporating both an electrostatic charging brush, and a electrostatic brush cleaner according to the present invention. Inasmuch as the art of electrophotographic printing is well known, the various processing stations employed in the printing machine illustrated in FIG. 1 will be described very briefly. In FIG. 1, the printing machine utilizes a photoconductive belt 10 which consists of an electroconductive substrate over which there is an imaging layer 14. Belt moves in a direction of arrow 16 to advance successive portions thereof sequentially through the various processing stations arranged about the path of movement thereof. Belt 10 is entrained about stripping roller 18, tensioning roller 20 and drive roller 22, all of which are mounted rotatably and are in engagement with the belt 10 to advance the belt in the direction of arrow 16. Roller 22 is coupled to motor 24 by suitable means such as a belt drive. Initially a portion of the belt 10 passes through charging station A comprising a rotatably mounted cylindrical charging brush 26 having a negative potential applied thereto to provide a relatively high substantially uniform negative potential on the belt. Following charging the photoconductive layer 14, the belt is advanced to exposure station B where an original document 28 is positioned face down on a transparent viewing platen 30. Lamps 32 flash light rays onto the original document 28 which are reflected and transmitted through lens 34 forming a light image thereof on the photoconductive surface 14 to selectively dissipate the charge thereon. This records an electrostatic latent image on the photoconductive surface 14 corresponding to the informational areas contained in the original document 28.

Thereafter the belt 10 advances the electrostatic latent image to development station C wherein a magnetic brush developer roller 36 advances a developer mix comprising toner and carrier granules into contact with an electrostatic latent image. The electrostatic latent image attracts the toner particles from the carrier granules thereby forming a toner powder image on the photonconductive belt. Thereafter, the belt 10 advances the toner powder image to transfer station D where a sheet of support material 38 has been fed by a sheet feeding apparatus in timed sequence so that the toner powder image developed on the photoconductive belt contacts the advancing sheet of support material at transfer station D. Typically the sheet feeding apparatus includes a feed roll 42 which is in rotational contact with the upper sheet of a sheet in a stack of sheets 44. The feed roll rotates so as to advance the uppermost sheet of a stack into the chute 48. The transfer station includes a corona generating device 50 which sprays ions of suitable polarity onto the back side of the sheet so that the toner powder image are attracted from the photoconductive belt 10 to the sheet 38.

Thereafter the sheet is transported to fusing station indicated generally by E which permanently affixes the transferred toner powder image to the sheet 38. Typically fuser E includes a heated fuser roll 52 adapted to be pressure engaged with the backup roller 54 so that the toner powder image is permanently affixed to the sheet 38. After fusing the toner image, the sheet 38 is advanced through guide chute 56 to copy catch tray 58 for removal from the printing machine by the operator. The belt next advances past a preclean corotron 55 to cleaning station F for removal of residual toner and other contaminates such as paper debris.

Figure 2:
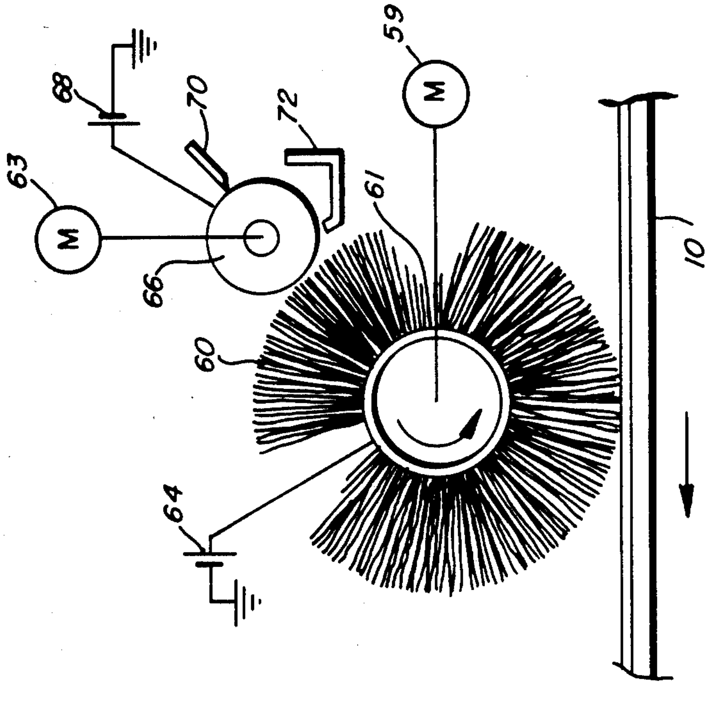
FIG. 2 is a schematic illustration of a cleaning apparatus utilized in the machine illustrated in FIG. 1.

As illustrated in FIG. 1 and with additional reference to FIG. 2, cleaning station F comprises an electrically conductive fiber brush 60 which is supported for rotation in contact with the photoconductive surface 14 by a motor 59. A source 64 of positive DC potential is operatively connected to the brush 60 such that an electric field is established between the insulating member 14 and the brush to thereby cause attraction of the positively charged toner particles from the surface 14. Typically a voltage of the order of negative 250 volts is applied to the brush. An insulating detoning roll 66 is supported for rotation in contact with the conductive brush 60 and rotate at about twice the speed of the brush. A source of DC voltage 68 electrically biases the detoning roll 66 to a higher potential of the same polarity as the brush is based. A metering blade 70 contacts the roll 66 for removing the toner therefrom and causing it to fall into the collector 72. Typically the detoning roll 66 is fabricated from anodized aluminum whereby the surface of the roll contains an oxide layer about 50 microns thick and is capable of leaking charge to preclude excessive charge buildup on the detoning roll. The detoning roll is supported for rotation by a motor 62. In cleaning brush configuration of FIG. 2 the photoconductive belt moves at the speed of about 22.25 inches per second while the brush rotates at a speed of about 30 to 60 inches per second adjacent the direction of the photoconductive belt movement. Furthermore, the electrostatic cleaning brush may have an outside diameter of the order of 2 and ½ to 3 inches with a pile height of about ¾ inch and a pile fiber fill density of about 30,000 fibers per square inch of 7 to 25 denier per filament fibers. The primary cleaning mechanism is by electrostatic attraction of toner to the brush fibers and being subsequently removed from the brush fibers by the detoning roll from which the blade scrapes the clean toner off to auger into a sump.

Figure 3:
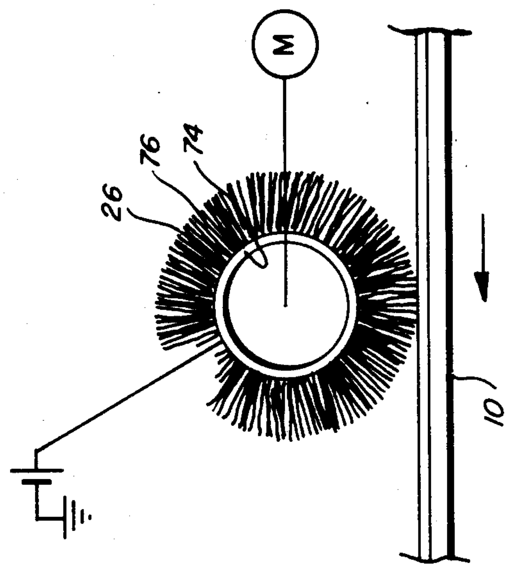
FIG. 3 is a schematic illustration of a charging apparatus utilized in a machine illustrated in FIG. 1.

Charging brush configuration of FIG. 3 shows a charging brush 26 rotating in the direction counter to the direction of movement of the photoconductive belt 10. The brush is driven by a motor M and rotates at a speed of about 30 to 60 inches per second relative to the photoconductive belt speed of about 22 inches per second. The charging brush comprises fibers 67 with a pile fiber fill density of 100,000 to 250,000 fibers per square inch of 1 to 10 denier per filament fibers, brush diameter of ¾ of an inch to 1 inch outside diameter, having a pile height of ⅜ of an inch. In this configuration the fabric is cut in approximately three eights to one half inch wide strips spirally wound around the core 74. Negative potential of about −800 to −1000 volts is applied to the charging brush results in a charge on the photoreceptor of from about −750 to about −980 volts. The primary mechanism by which the photoconductive layer is charged is by contact electrostatic charging by the brush fibers in running against the photoconductive surface.

The cylindrical fiber brush comprising a spirally wound conductive pile fabric strip wound on an elongated cylindrical core may be fabricated from any suitable materials in any suitable configuration. Typically the core is from about ¼ inch to 3 inches in diameter and is composed of cardboard, epoxy or phenolic impregnated paper, extruded thermoplastic material or metal providing the necessary rigidity and dimensional stability for the brush to function well during its operation. The core may be electrically conductive or non-conductive. The brush fibers can be made of any suitable material which enables them to function as electrodes and typically have a resistivity of $10^{-6}$ to $10^9$ ohm cms and preferably a conductivity of $10^3$ to $10^7$ ohm-cms. to minimize any shorting of electrical components by any loose fibers. Typically they are made from fine diameter stainless steel or other metals, carbon black impregnated rayon, carbon black filled nylon, carbonized polyacrylonitrile polyester, carbonized rayon, metallized organic fibers, nickel plated nylon or other conductive or semi-conductive fine diameter textile fibers. Typically the fibers for cleaning brushes are about 30 to 50 microns in diameter and for charging brushes are 7 to 30 microns in diameter. The fiber material selected should have sufficient tensile strength to withstand a knitting or pile weaving process, not be brittle, be environmentally stable and not outgas, and should not film the photoreceptor or block or otherwise be incompatible with either the photoreceptor or the toner. In addition to assure optimum charging and cleaning performance the fibers should be relatively resilient so that when after contact with the operational surface they bounce back readily into their original configuration. Further to enhance cleaning and charging in the seam gap region the fibers at the strip edges may have a resistivity selected to achieve uniform performance. For example, the fiber at the edges could have a resistivity lower by an order of magnitude than the bulk of the fibers in the center of the strips.

Figure 4:
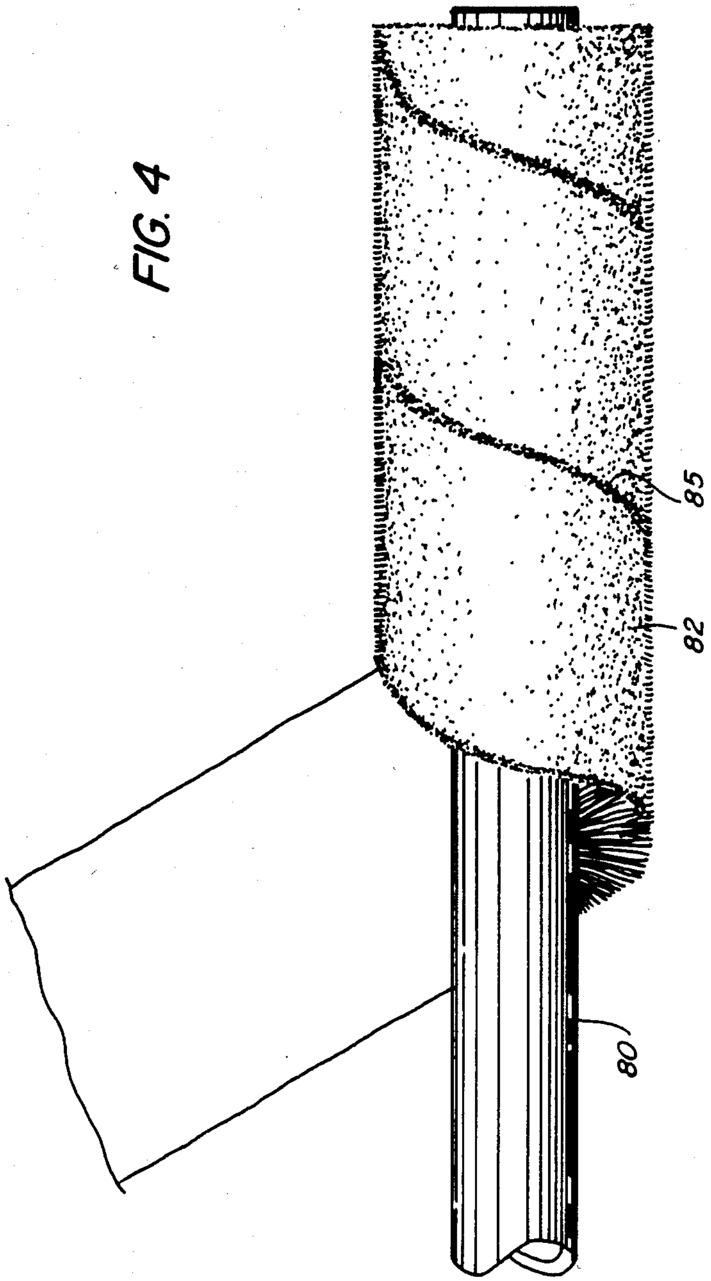
FIG. 4 is an isometric illustration of a cylindrical fiber brush according to the present invention.

For electrostatic charging brush applications the brush diameter is typically of the order of ¾ inch to 1 inch in outside diameter with a pile height of about 0.1 to 0.5 inch and a pile fiber fill density of in the order of 100,000 to 250,000 fibers per square inch of from about 1 to 10 denier per filament fibers in the center portion of the fabric strip. For cleaning brush applications a lower fiber fill density is used to enable the brush to hold and transport toner within the pile matrix. Typically the cleaning brushes have an outside diameter of 2½ to 3 inches with a pile height of ¼ of an inch to 1 inch, preferably about ¾ of an inch to enable suitable interference between the photoreceptor and brush and detoning roll and brush without fiber setting. The fiber fill density is of the order of 14,000 fibers to 40,000 fibers per square inch of from about 7 to about 25 denier per filament fiber preferably 25,000 to 35,000 in the center portion of the fabric strip for optimum cleaning performance FIG. 4 is a schematic illustration of a spirally wound conductive pile fabric strip on a cylindrical core 80 with a cut plush pile woven fabric strip 82 spirally wound about the core. As may be observed the number of fibers at the fabric edges and thus the effective fiber fill density across any seam gap is increased to about double the strip edges which form the brush.

The cylindrical fiber brush according to the present invention may be fabricated using conventional techniques that are well known in the art. The initial step of weaving fabric is accomplished from conventional techniques wherein it can be woven in strips on a narrow loom, for example, or be woven in wider strips on a wide loom leaving spaces between the strips. During the weaving process, a plush pile woven fabric is produced such that the fiber fill density of the fabric strip a the strip edges is at least double the fiber fill density in the center portion of the fabric strip.

Figure 8:
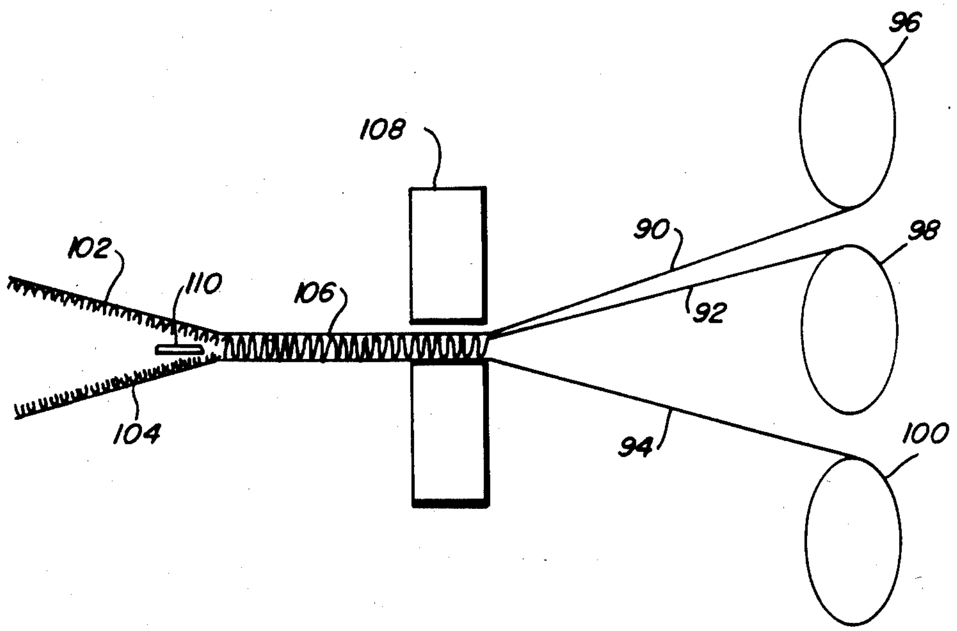
FIG. 8 is a schematic illustration of a conventional weaving system.
Figure 9A:
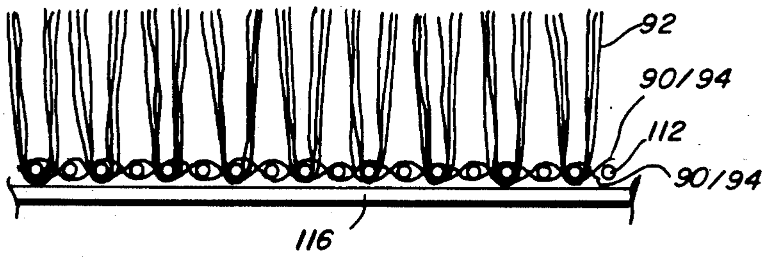
FIGS. 9A, 9B are schematic cross sections of fabric with a "V" or "U" weave configuration in the center and at the strip edges respectively.
Figure 9B:
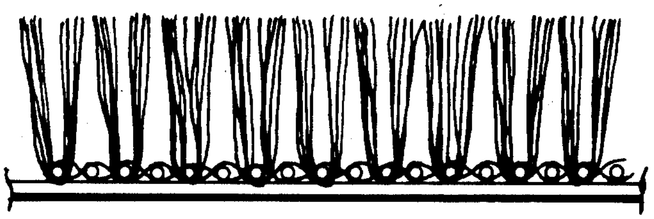
Figure 10A:
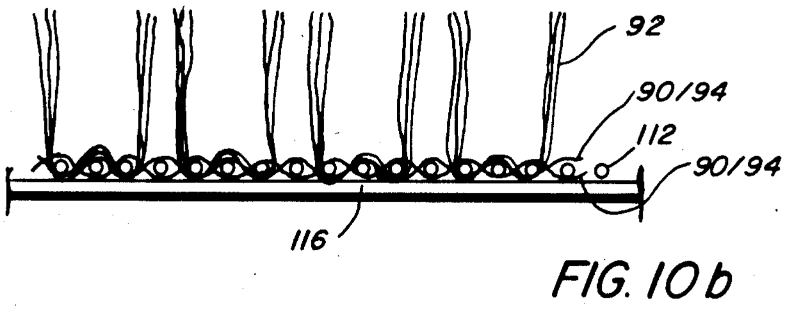
FIGS. 10A, 10B are schematic cross sections of fabric with a "W" configuration in the center and at the strip edges respectively.
Figure 10B:
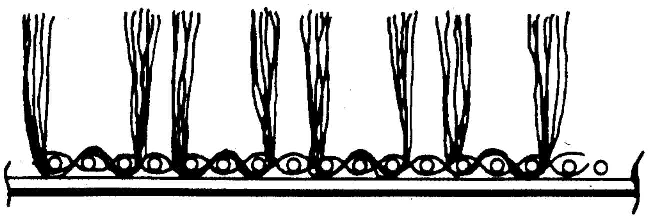

FIG. 8 schematically illustrates a conventional weaving apparatus where high edge density pile fabrics can be made using any suitable shuttle or shuttleless pile weaving loom. A woven fabric is defined as a planar structure produced by interlacing two or more sets of yarns whereby the yarns pass each other essentially at right angles. A narrow woven fabric is a fabric of 12 inches or less in width having a selvage edge on either side. A cut pile woven fabric is a fabric having pile yarns protruding from one face of the backing fabric where the pile yarns are cut upon separation of two symmetric fabric layers woven at the same time.

A general explanation of the weaving process is described below with references to FIG. 8. Wrap yarns for upper backing 90, lower backing 94, and pile 92 are wound on individual loom beams 96, 98 and 100. All yarns on the beams are continuous yarns having lengths of many hundreds or thousands of yards and are arranged parallel to each other to run lengthwise through the resultant pile fabric. The width of the fabric, the size of wrap yarns, and the number of wrap "ends" or yarns per inch desired in the final fabric will govern the total number of individual wrap yarns placed on the loom beams and threaded into the loom. From the loom beams, the yarns feeding the upper backing fabric 102, the lower backing fabric 104, and the pile 106 are led through a tensioning device (usually a whip roll and lease rods) and fed through the eyes of heddles and then through dents in a reed 108. This arrangement makes it possible to manipulate the various wrap yarns into the desired fabrics. As the wrap yarns are manipulated by the up and down action of the heddles of the loom, they separate into layers creating openings called sheds. The shuttle carries the filling yarn through the sheds thereby forming the desired fabric pattern. The woven fabric having both an upper and lower backing 102, 104 with a pile 106 in between is cut into two fabrics by a cutter 110 to form two cut plush pile fabrics. For high edge density, pile fabrics a similar set up and loom are used. Also multiply yarns wherein two or more yarns yield a "2 ply" or "higher pile" yarn can be substituted for the normal single ply yarns on the pile beam in locations corresponding to the edges of finished fabrics. All other wrap and filling yarns remain the same Alternatively the pile density may be increased at the strip edges by the use of a higher filament count single yarn. As a matter of practical convenience it is easier to use the multiply technique rather than the larger filament count yarn. A particularly preferred fabric is a cut plush pile woven fabric. Following weaving if the fabric has been woven on a wide loom leaving spaces between adjacent strips the fabric may be slit into strips by slitting the woven backing between the pile strips. Following the weaving techniques the fabric strips are coated with a conductive latex such as Emerson Cumming's Eccocoat SEC which is thereafter heated to drive off water. Thereafter the fabric strip is slit to the desired width dimension making sure not to cut into the pile region but coming as close to it as possible by conventional means such as by hot knife slitter, or by ultrasonic slitter. The high edge density pile fabrics can be woven into a "V" or a "W" configuration as illustrated in FIGS. 9A, 9B and 10A, 10B respectively with single ply yarns appearing in the center position (FIGS. 9A, 10A) of the pile fabric strips and the multiply pile yarns occupying the outermost edge positions (FIGS. 9B, 10B) of the fabric. In FIGS. 9A, 9B, 10A and 10B reference numbers 90 or 94 illustrate the backing wrap yarns for the top and bottom cut pile fabrics respectively. Reference number 112 illustrates the filling yarns, 92 the pile yarns and the latex backing 116. The single pile may, for example, be made from 1/600/40 yarn and the multiply pile may be made from 2/600/40 or 3/600/40 yarn or alternatively from 1/1200/80 yarn.

The fabric strip is spirally wound onto the fabric core and held there with an adhesive to bind the fabric to the core. The width of the strip is dictated by the core size, the smaller cores generally require narrower fabric strips so it can be readily wrapped. The adhesive applied may be selected from readily available epoxy, hot metal adhesives, or may include the use of double back tape. In the case of liquid or molten adhesives, they may be applied to the fabric alone, to the core alone or to both and may be conductive or non-conductive. In the case of double backed tape it is typically applied to the core material first. The winding process is inherently imprecise in that there is an inability to control the seam gap between fabric windings. This is because the fabric responds differently to tension by way of stretching, deforming or wrinkling. The fabric strip is wound in a constant pitch winding process whereby the spiral winding a spiral angle is based upon a knowledge of the core diameter and the fabric width. Typically the core circumference is projected as a length running diagonally on the fabric from one edge to the other, and the winding angle is derived by this diagonal and the perpendicular between the two fabric edges.

Reference is now made to FIGS. 5-7 to illustrate in exaggerated detail the technique according to the present invention. In FIG. 5, a fabric strip according to the prior art is illustrated with individual multi filament pile yarns 82 uniformly spread across the backing 84 with a small flange 86 at each end. As may be appreciated when such a fabric is spirally wound around the cylindrical core adjacent flanges 86 can provide a considerable space between fiber piles of the strip edges. FIG. 6A, 6B and 6C illustrate the technique according to the present invention wherein the outermost pile ends 83 at the strip edges has an enhanced fiber fill density of at least double the fiber fill density in the center portion of the fabric strip. FIG. 6A the fiber fill density is double at the outermost pile end, while in FIG. 6B the fiber fill density is triple at the outermost pile end and in FIG. 6C the density at the outermost pile end is triple and the next outermost pile end 87 is double the normal fiber fill density in the center portion of the fabric strip. This may be accomplished by using both a "triple ply" and a "double ply" yarn in these respective locations.

FIG. 7A is an enlarged sectional view illustrating adjacent fabric windings on cylindrical core 80. As illustrated there is a seam gap 88 formed between flanges 86 of adjacent strip portions. FIG. 7B is a representation of the orientation of the fibers after a very short period of rotation of the fiber in contact with the surface showing that the fibers tend to fill the gap between the seams by flaring into the gap indicating that the mere presence of additional filaments tend to crowd the edge between adjacent strip windings. The increase in the number of fibers at the edge of the fabric should be chosen to achieve the desired flare. In FIG. 7A and 7B due to manufacturing constraints and to avoid overlapping of fabric backing onto the abutment of the flanges of the spiral fabric strip between the pile region of adjoining fabric strips, adjacent windings can form a space between the adjacent pile regions which is at least about 1 mm and may be as large as 5 mm in width. As may be observed from FIG. 7B, the additional fiber fill density at the fabric strip edges substantially fills the space at the adjacent pile ends with use.

Thus according to the present invention a cylindrical fiber brush useful for both charging and cleaning applications in electrostatographic reproducing apparatus has been provided. The additional fiber fill density at the strip edges of the fabric strip minimizes the effects of the seam winding and enables improved cleaning and charging performance without having to increase the rotational speed of the brushes during their operation. This reduces abrasion on the imaging surface, toner emission and high machine contamination, operational noise and the requirement for more expensive structural support and bearings as well as additional power.

The patents and applications referred to herein are hereby totally incorporated in the instant specification in their entirety by reference thereto.

While the invention has been described with reference to specific and preferred embodiments, it will be appreciated that various modifications and variations will be apparent to the artisan. All such modifications and embodiments that may readily occur to one skilled in the art are intended to be within the scope of the appended claims.

What is claimed is:

1. A cut plush pile woven fabric strip comprising a fabric backing with a woven plush pile, the backing forming a small flange on each side of the pile and wherein the fiber fill density at the outermost pile ends at the strip edges is at least double the fiber fill density in the center portion of the fabric strip.

2. The fabric strip of claim 1 wherein said fibers are conductive having a resistivity of between $10^{-6}$ and $10^9$ ohm-cm.

3. The fabric strip of claim 1 wherein said fibers have a resistivity of from about $10^3$ to about $10^7$ ohm-cm.

4. The fabric strip of claim 1 wherein the fiber fill density is from about 14,000 to 40,000 fiber per square inch of from about 7 to about 25 denier per filament fibers.

5. The fabric strip of claim 1 wherein the fiber fill density is from about 100,000 to about 250,000 fibers per square inch of from about 1 to 10 denier per filament fibers.

6. The fabric strips of claim 1, wherein said fibers are carbon filled rayon, carbon coated nylon, carbon filled nylon, carbonized polyacrylonitrile or stainless steel.

* * * * *